INVENTOR.
LINWOOD G. TUCKER.
BY Stanley J Price
his ATTORNEY.

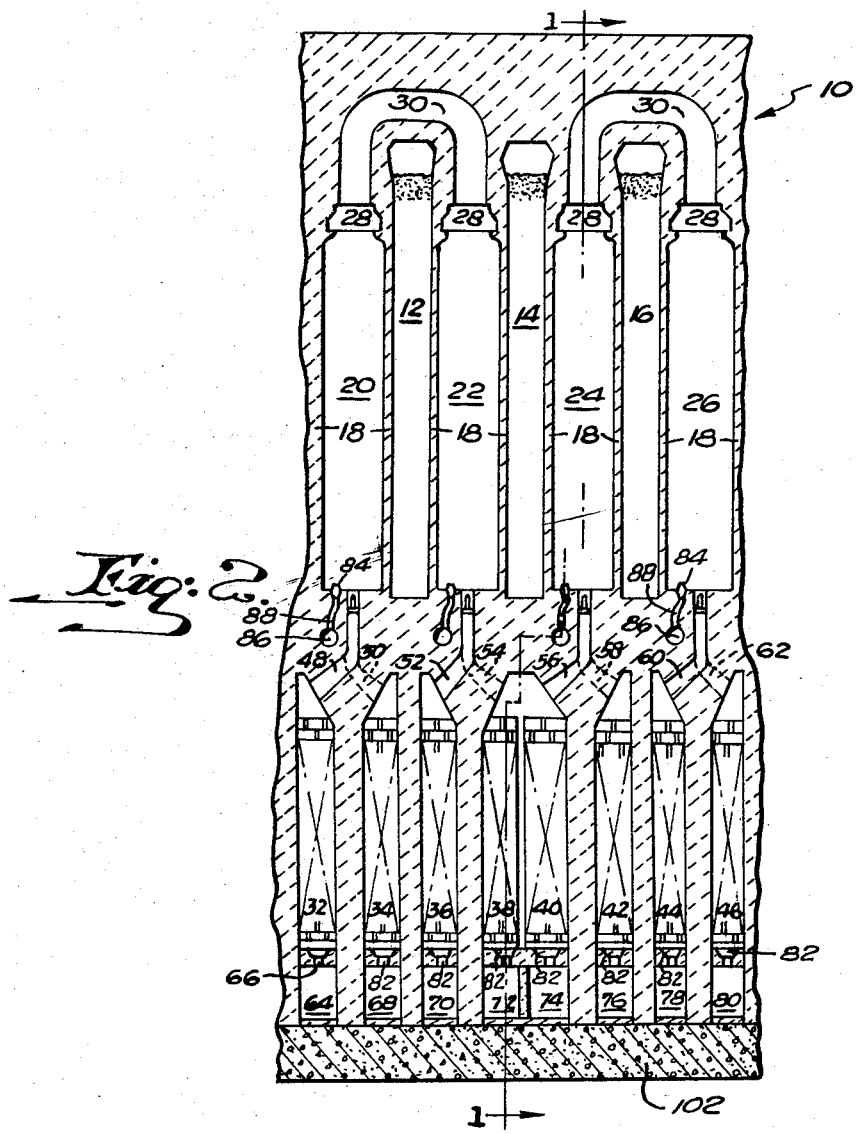

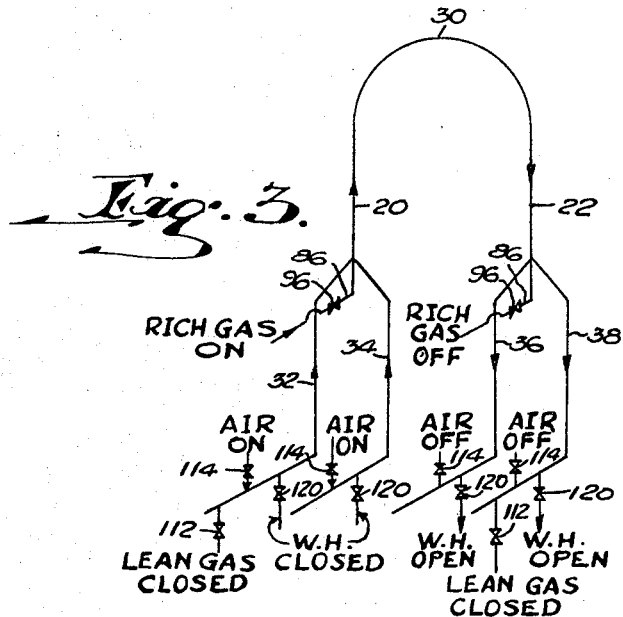
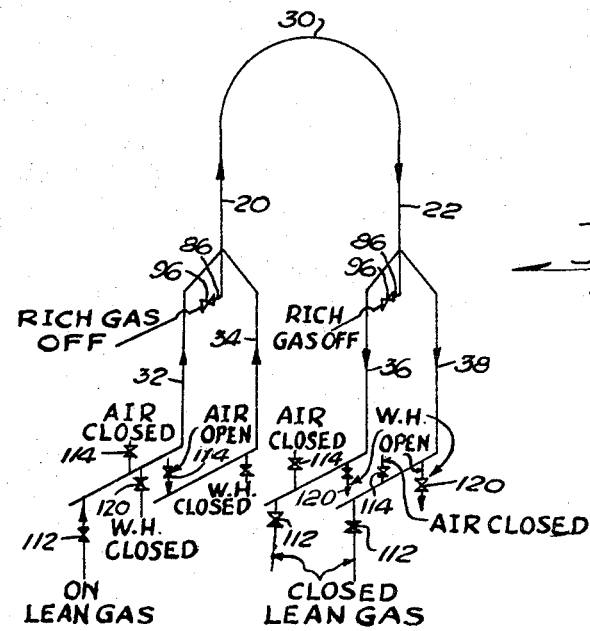

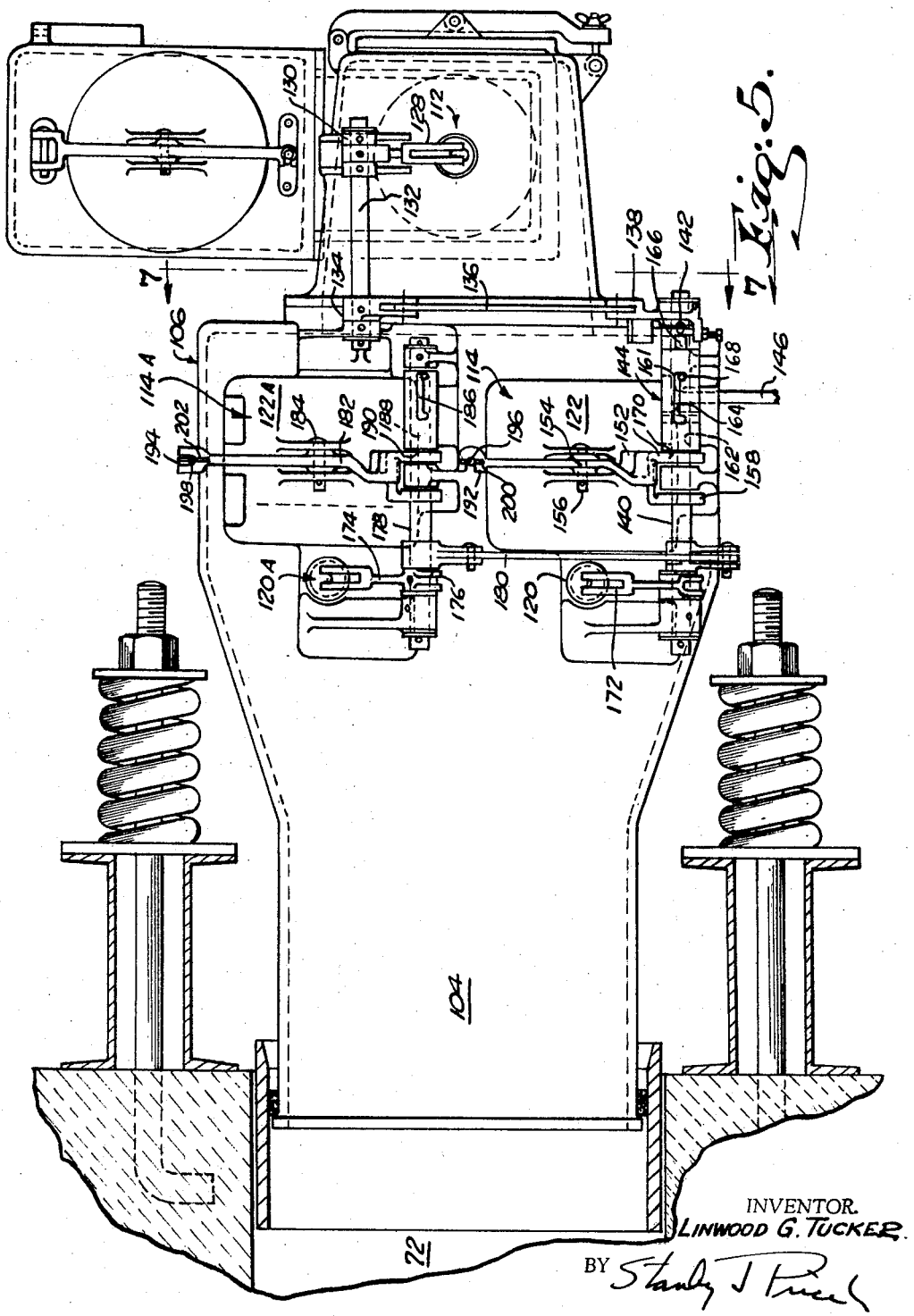

INVENTOR.
LINWOOD G. TUCKER
BY Stanley J Price
his ATTORNEY.

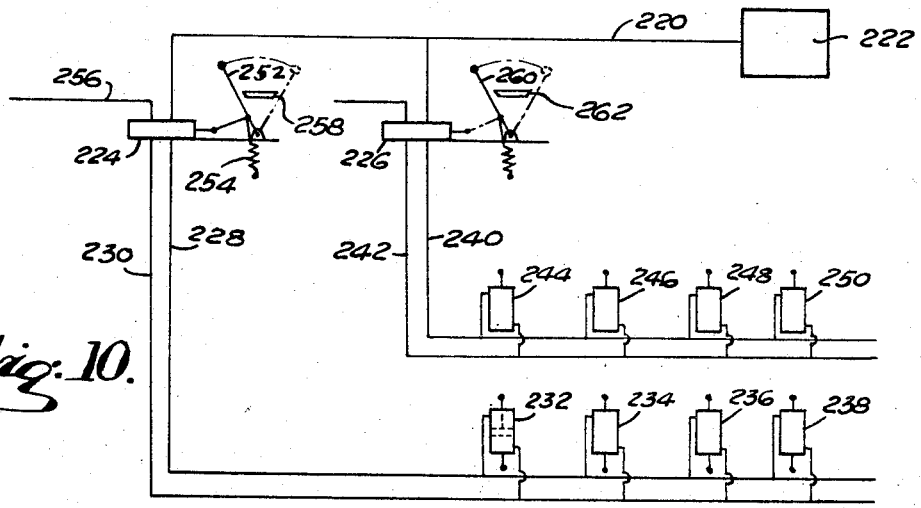
Fig. 10.
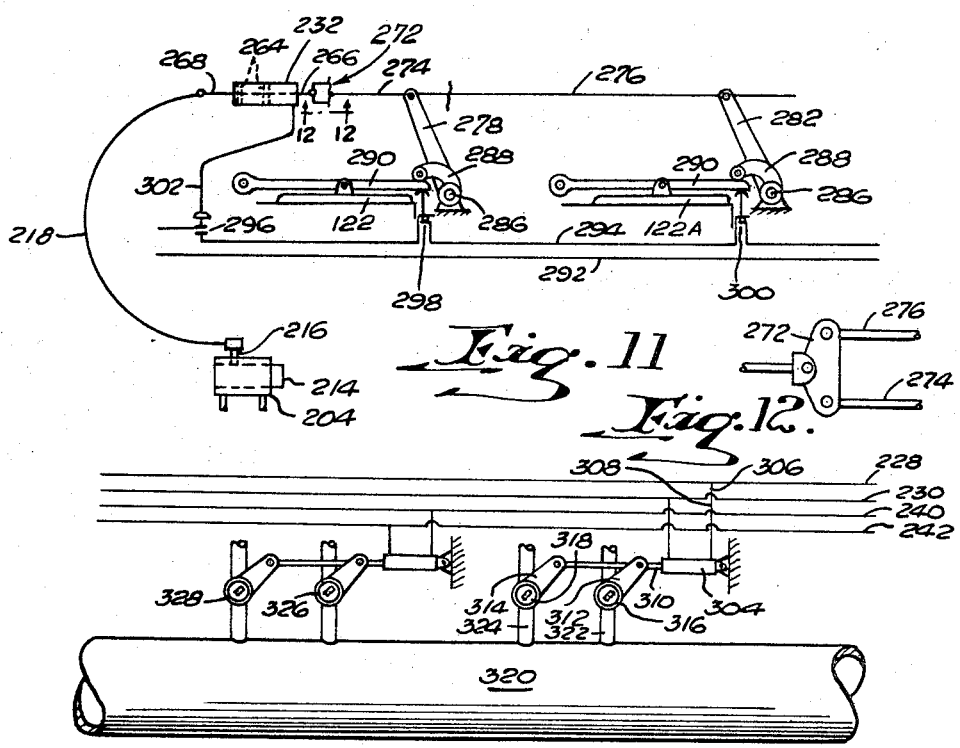
Fig. 11.
Fig. 12.
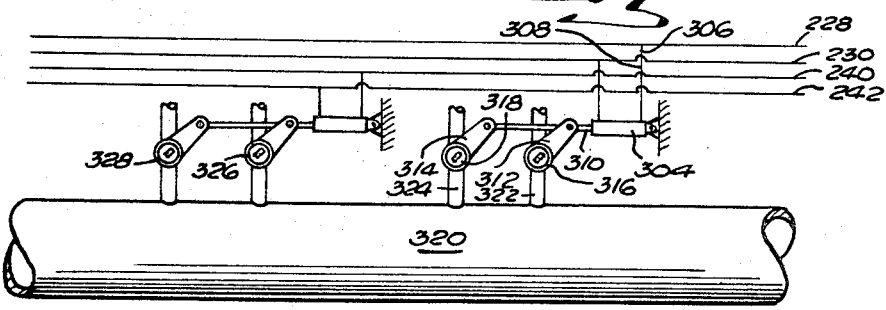
Fig. 13.
INVENTOR.
LINWOOD G. TUCKER.
BY Stanley J Price
his ATTORNEY.

3,433,716
APPARATUS FOR REMOTELY SHIFTING REGENERATIVE COKE OVEN BATTERIES FROM RICH FUEL GAS HEATING TO LEAN FUEL GAS HEATING
Linwood G. Tucker, Pittsburgh, Pa., assignor to Koppers Company, Inc., a corporation of Delaware
Filed June 22, 1965, Ser. No. 465,897
U.S. Cl. 202—151   11 Claims
Int. Cl. C10b *21/10, 21/06*

ABSTRACT OF THE DISCLOSURE

This disclosure relates to apparatus for remotely shifting the entire coke oven battery from combustion of rich fuel gas to the combustion of lean fuel gas in the combustion flues. A central actuator is connected to the clutch shaft of each clutch or actuator that alternatively connects the reversing mechanism to the air valve and a lean gas valve for each respective flue. A locking device for locking the air valves in a closed position is also connected to the central actuator. A hydraulic actuator is also provided to selectively open and close the rich gas valves associated with the respective flues.

---

This invention relates to a method and apparatus for remotely shifting the entire regenerative coke oven battery from rich gas heating to lean gas heating, and more particularly to a method and apparatus for controlling all the air and lean gas valves of a regenerative coke oven battery from a single station so that the desired valves may be opened or closed for the use of either rich fuel gas or lean fuel gas in the heating of the coke oven chambers.

In a regenerative coke oven as, for example, the Koppers-Becker ovens, apparatus is provided for burning either rich (coke oven) fuel gas and air, or lean (producer or blast furnace) fuel gas and air in the combustion chambers of the coke oven. Where rich fuel gas is employed, the air is regeneratively heated before it is admixed with the rich fuel gas in the combustion chambers or flues. The rich fuel gas is not preheated prior to combustion. Where lean fuel gas is employed, both the air and the lean fuel gas are separately preheated before the lean fuel gas is admixed with the air in the combustion flues.

The regenerative coke ovens are subjected to cyclic operation where during one cycle certain of the heating chambers or flues are "on" flues. The fuel gas and air are supplied to the "on" flues and combustion of the fuel gas takes place therein. Other "off" flues are suitably interconnected to the "on" flues by crossover ducts and serve to withdraw the gaseous products of combustion (waste gas) from the "on" flues. The waste gas flows through the "off" flues and further heats the coke oven chamber walls. The waste gas is withdrawn from the "off" flues through selected regenerators that are in heat exchange relation with other regenerators through which the incoming air or air and lean fuel gas, depending whether the ovens are being heated by rich fuel gas or lean fuel gas, flows and is preheated before the gas and air enter the "on" flues. A suitable reversing mechanism is provided to reverse the direction of gas flow so that the flues that received the "waste gas" are now the "on" flues in which combustion takes place.

The flow of air or air and lean fuel gas to the regenerators and the withdrawal of waste gas from the regenerators to the waste gas flue are controlled by suitable valve means. At the end of each heating cycle, reversal of the direction of gas and air flow is effected by appropriate operation of these various valve means. This operation of the various valve means is effected by the reversing mechanism which is connected by means of cables or rods to the various valve means to operate the valves in an appropriate preselected cycle.

To heat the coke ovens by rich fuel gas the air valves associated with each of the "on" flues are opened to permit the desired amount of air to flow through the regenerators to be preheated and thereafter admixed with the rich fuel gas in the "on" flues. The rich fuel gas is supplied to the preselected flues through either a gas gun type arrangement or by means of an "underjet" arrangement wherein the rich fuel gas without preheating is supplied directly to the coke oven chambers. Where the ovens are heated by lean fuel gas, certain of the air valves supplying air to the regenerator chambers are closed and the lean gas valve associated therewith is opened. The lean fuel gas is then heated in the regenerators and is admixed with heated air in the "on" flues. It is essential, when the lean gas valve is open, that the air valve associated therewith be tightly closed to prevent the admixture of air and lean fuel gas in the regenerators where premature combustion or an explosion may occur. To eliminate the possibility of both lean fuel gas and air flowing into the same regenerator, the valves for the air and lean fuel gas are interconnected so that only one of the valves may be opened during the "on" cycle. A two position lever type actuator (clutch) is connected to the air and gas valve that supply the same regenerator. The actuator when moved to one position permits the reversing mechanism to open and close the lean gas valve. In the second position, the actuator permits the reversing mechanism to open and close the air valves. The air and air-gas valves are so arranged that lean gas is supplied to only one bank of regenerators associated with the row of flues and air is supplied to the other bank of regenerators. This permits both the air and lean gas to be heated and thereafter admixed and burned in the "on" flues.

It has been the practice in the past to manually move the two position actuator into one or the other of the two positions, depending on whether the oven is heated by rich fuel gas or lean fuel gas. A latch type safety mechanism is also provided for the air valves. When the actuator is positioned to open and close the lean gas valve, the latch mechanisms are manually locked to maintain the air valves in a closed position.

With the above apparatus, in order to shift from rich fuel gas to lean fuel gas, it is necessary for the coke oven battery operator to manually shift each actuator of the air-gas valves that are connected to the "off" flues to a position where the reversing mechanism will, during the next cycle, open the lean gas valve instead of the air valve. It is also necessary for the operator to manually lock the air valves in a closed position. During the next operating cycle the reversing mechanism opens the preselected lean gas valves instead of the air valves, as had previously occurred when the flues were heated by rich fuel gas. The operator would also disengage the rich fuel gas valves of the "off" flues so that only lean fuel gas would be supplied to the flues during the next cycle of operation. After completion of the reversal cycle and the former "off" flues were now functioning as "on" flues and supplying lean gas to the now "on" flues, the operator would again be required to shift the actuators on the preselected valves for the "off" flues. This required the operator to again change the preselected valves along the length of the regenerative coke oven battery. There is a need, therefore, for apparatus, preferably remotely controlled, that permits the entire coke oven battery to be shifted or changed over from the combustion of rich fuel gas to the combustion of lean fuel gas without the operator manually shifting the separate actuators associated with each of the air and gas valves.

I have discovered that it is now possible to remotely shift the actuators associated with the proper air and lean gas valves and to lock the air valves in a closed position when the actuator is positioned to open and close the lean gas valve. With this arrangement the type of fuel supplied to the coke oven battery during the next cycle may be quickly, efficiently and safely changed.

Briefly, the invention includes a centrally located actuator mechanism that supplies a signal to a device associated with the preselected actuators for the air-gas valves connected to the then "off" flues. The signal supplied by the centrally located actuator shifts the actuator or clutch associated with the selected individual air-gas valves for the desired operation during the next cycle. Where the centrally located actuator provides a signal for the individual actuator to open the lean gas valve during the next cycle of operation, a second signal is provided to actuate a locking means for the air valves. A signal, preferably visual, is supplied to the centrally located actuator indicating that the desired air valves are in a closed and locked position. Means may also be provided to open and close the proper rich fuel gas valves so that during the next cycle the valves are either opened or closed depending on the desired type of gas to be fed to the flues.

A second central actuator is arranged to provide a signal for the other air and gas valve actuators that are associated with the other bank of flues so that when the reversing mechanism changes the heating cycle, the former "on" flues which are now "off" flues may also be shifted in a similar manner to the desired lean or rich gas. Safety means interlocking the centrally located actuators prevents a signal from being transmitted to the actuators associated with the waste heat and air valves when the flues associated with the valves are "on" flues and supplying combustion gas or air to the flues. Stated otherwise, the safety means permits shifting only when the flues associated with the gas waste heat valves are "off" flues.

Accordingly, the principal object of this invention is to provide a remotely controlled shifting mechanism for changing the tppe of gas to be supplied to the flues during the next cycle.

Another object of this invention is to provide remotely controlled shifting mechanism for locking the air valves in a closed position when it is desired to supply lean gas to the selected flue.

Another object of this invention is to provide a remotely controlled shifting mechanism that includes visual means to determine whether the remotely located air valves are in a closed and locked position before the regenerative coke oven is reversed.

These and other objects and advantages of this invention will be more completely disclosed and described in the following specification, the accompanying drawings and the appended claims.

In the drawings:

FIGURE 1 corresponds to a vertical section taken along the line 1—1 of FIGURE 2.

FIGURE 2 is a diagrammatic vertical section taken longitudinally of the coke oven battery illustrated in FIGURE 1 and is taken along the line 2—2 thereof.

FIGURE 3 is a diagrammatic illustration of a pair of interconnected flues and the relative position of the gas, air and waste heat valves associated therewith when the flues are heated with rich fuel gas.

FIGURE 4 is a diagrammatic view similar to FIGURE 3 illustrating the relative position of the valves associated with the interconnected flues when the coke oven battery is heated by means of lean fuel gas.

FIGURE 5 is a top plan view of a reversing box containing the lean fuel gas, air and waste heat valves associated with a single flue of a regenerative coke oven battery.

FIGURE 10 is a diagrammatic representation of the remote control mechanism for shifting the actuators associated with the respective lean gas and air valves.

FIGURE 11 is a diagrammatic representation of apparatus for moving the actuator member associated with the lean gas and air valve and apparatus for locking the air valves in a closed position.

FIGURE 12 is a section taken along the line 12—12 of FIGURE 11 illustrating an equalizing device for the air latch mechanisms.

FIGURE 13 is a diagrammatic view of a remote control mechanism for opening and closing the rich fuel gas valves.

Figure 1:
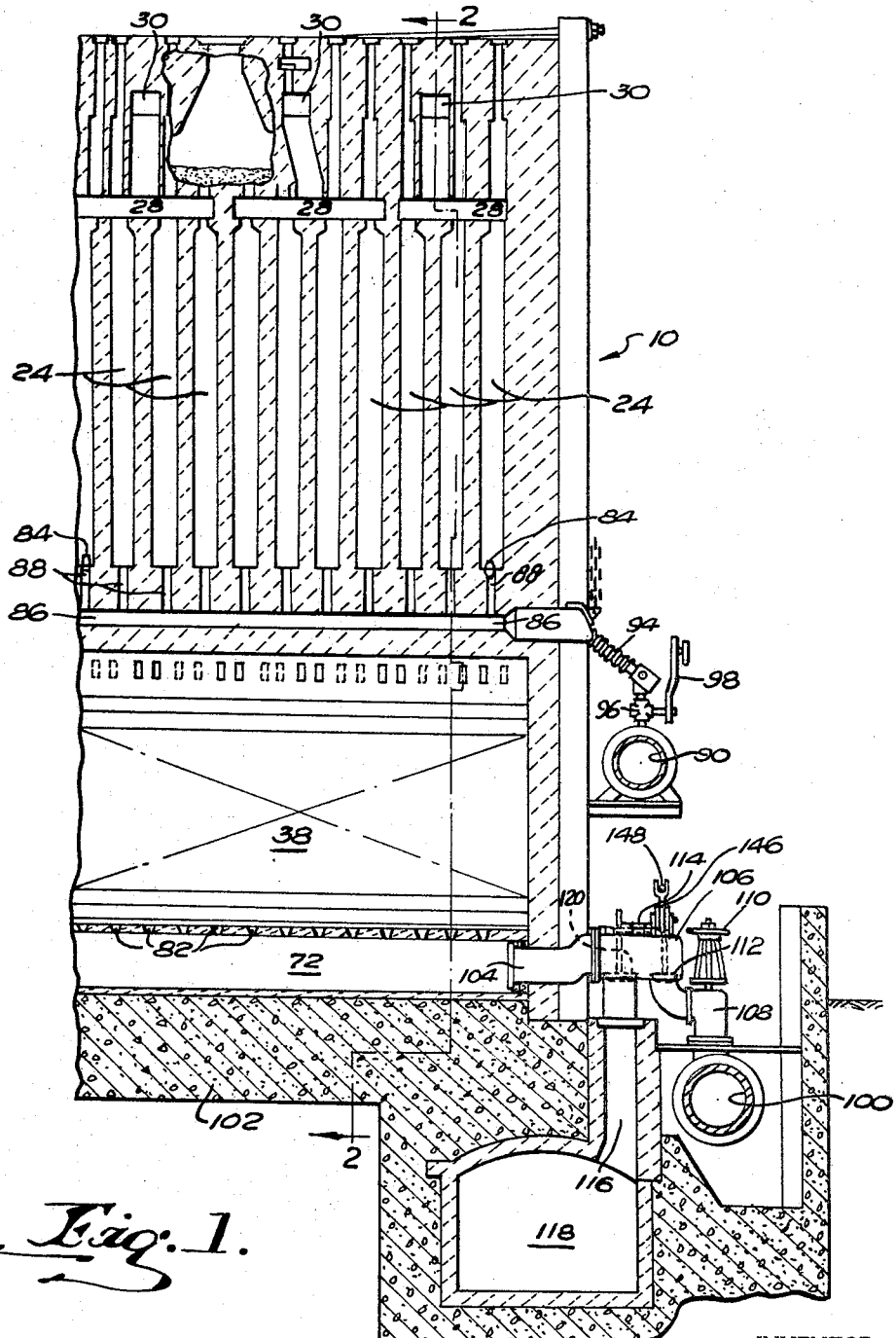
FIGURE 1 is a diagrammatic vertical section taken transversely of a coke oven battery employing a gun flue feed for rich fule gas and illustrating the valve mechanisms for controlling the flow of gases through the regenerators.

Referring to the drawings and particularly FIGURES 1–4, ther is illustrated a coke oven batery generally designated by the numeral 10 that includes a plurality of parallel spaced transverse coking chambers as, for example, chambers 12, 14, and 16 illustrated in FIGURE 2. Heat is supplied to the coking chambers by means of elongated heating chambers positioned between the transverse coking chambers. The heating chambers comprise rows of vertical flame flues as, for example, transverse rows 20, 22, 24 and 26 illustrated in FIGURE 2. In FIGURE 1, which is a section taken along the line 1—1 of FIGURE 2, the transverse row of flame flues 24 is illustrated. The vertical flame flues in each row are arranged in groups in order to provide a common crossover duct that is connected to the groups of flues on opposite sides of a coke oven. In FIGURES 1 and 2 the groups of flues are connected to horizontal bus ducts 28 and the bus ducts on opposite sides of a coking chamber are connected by means of a crossover duct 30. With this arrangement when combustion takes place in a group of vertical flues, for example, flues 20 in FIGURE 2, the products of combustion (waste gas) flow upwardly through the vertical flues 20 to the horizontal bus duct 28 to the common crossover duct 30 where the waste gas is conveyed downwardly through the bus duct 28 to the connected group of vertical flues 22 on the opposite side of the coke oven chamber 12. Beneath the coking chambers and the heating flues there are a plurality of regenerators as, for example, regenerators 32, 34, 36, 38, 40, 42, 44 and 46 as illustrated in FIGURE 2. Regenerator 32 is connected to the row of transverse flues 20 by a plurality of conduits 48 in the oven brickwork separating the regenerators from the coke oven chambers and heating flues. Likewise the regenerator 34 is also connected to the row of flues 20 by means of conduits 50. Similarly the regenerator 36 is connected to the row of vertical flues 22 by means of conduits 52. The adjacent regenerator 38 is connected to rows of flame flues 22 by conduits 54. The other regenerators are similarly connected to the rows of flues 24 and 26 by means of conduits 56, 58, 60, and 62.

Each of the regenerators has an elongated transverse sole flue positioned therebeneath. For example, in FIGURE 2 regenerator 32 has an elongated sole flue 64 positioned therebeneath and has a plurality of vertical openings 66 extending through the brickwork separating the sole flue from the regenerator positioned thereabove to permit air or gas in sole flue 64 to flow upwardly through the openings 66 into the regenerator 32. The other regenerators illustrated in FIGURE 2 have sole flues 68, 70, 72, 74, 76, 78 and 80 positioned therebeneath and connected thereto by openings 82 in the brickwork separating the sole flue from the regenerator positioned thereabove.

FIGURE 1 illustrates the regenerator 38 with the sole flue 72 positioned therebelow and the openings 82 for the flow of gas or air from the sole flue to regenerator 38. The rows of vertical flame or combustion flues are supplied with rich fuel gas from nozzles 84 in the base of each flue and are connected to a longitudinal conduit 86 by means of vertical conduits 88. With this arrangement gas supplied through conduit 86 flows upwardly through the plurality of vertical conduits 88 through the nozzle or opening 84 into each of the flues in the respective rows. This arrangement for supplying rich fuel gas to the heating flues is generally referred to as a gas gun feed for rich fuel gas.

Referring to FIGURE 1, a rich gas supply conduit 90 is illustrated as extending longitudinally along the side of the coke oven battery 10. The rich gas supply conduit 90 is connected to each of the transverse supply conduit 86 by means of a branch conduits 94. There is a rich gas valve 96 positioned in each branch conduit 94 to control the flow of rich gas from the main supply conduit 90 to the transverse conduit 86. A lever 98 is connected to valve 96 and is operable to open and close the same. The lever 98 is suitably connected to a cable or rod of the reversing mechanism that extends around the peripheral boundary of the coke oven battery. Thus, by actuation of the reversing mechanism the valve 96 is opened or closed. Each transverse row of flues has a conduit 86 positioned therebelow and a connection to the main supply conduit.

A lean gas supply conduit 100 extends longitudinally along the side of the coke oven battery 10 below the sole flues and the oven pad 102. Each of the sole flues has a conduit 104 extending horizontally therefrom and terminating in a box-like structure 106 which is generally designated as a reversing box. The lean gas conduit 100 is connected to the reversing box 106 by a branch conduit 108. Manually operated valve 110 is positioned in the conduit 108 to manually control the flow of lean fuel gas therethrough. In the reversing box 106 there is a control valve generally designated by the numeral 112 for controlling the flow of lean fuel gas into the horizontal conduit 104 and the sole flue 72. The reversing box 106 also has a plurality of lids 114 (FIGURE 5) that control the flow of air into the sole flue 72. For convenience, throughout the remainder of this specification the air lids 114 will be also designated as air valves.

A vertical conduit 116 is connected to the reversing box 106 at one end and at the other end opens into a waste gas flue 118 that extends longitudinally along the side of the coke oven battery 10. A valve 120 is located in the reversing box 106 controls the flow of waste gas from the sole flue through the conduit 116 into the waste gas flue 118.

Lean gas valve 112, air valves 114 and waste gas valves 120 are connected, as will be later described, to a lever that is, in turn, connected to the reversing mechanism by means of control rods or cables. Thus, the reversing mechanism can open the waste gas valve 120 to permit the waste gas to exhaust from regenerator 38 through sole flue 72 into the waste gas flue 118 and simultaneously close the air valves 114 or the lean gas valve 112. The reversing mechanism can open either the air valve 114 or the lean gas valve 112 and close the waste gas valve 120 to permit air or lean gas to flow through conduit 104 into the transverse sole flue 72 and into regenerator 38.

FIGURES 3 and 4 are schematic diagrams of a group of flues 20 and 22 interconnected by a crossover duct 30. When the group of flues 20 are the "on" flues and are heated by rich fuel gas, the rich gas valve 96 associated with the group of flues 20 is open to permit the flow of rich gas into the vertical flues 20. The rich gas valve 96 associated with the group of flues 22 that are the "off" flues is closed. Since the battery is being heated by rich gas, the lean gas valves 112 are closed. The air valves 114 controlling the flow of air through the regenerators to the vertical "on" flues 20 are open and the waste heat valves 120 are closed. With this arrangement of the respective valves, air flows through valves 114 into the regenerators 32 and 34 and into the vertical flue 20 where it is admixed with rich fuel gas supplied through the conduit 86. The air valves 114 associated with the "off" flues 22 are closed and the waste heat valves 120 are open. Thus the products of combustion, i.e. waste gas, are conveyed through crossover duct 30 and downwardly through the interconnected group of flues 22 through the regenerators 36 and 38 to the sole flues 70 and 72 and through the waste gas flue 118 to the coke oven stack, not shown.

To reverse the arrangement illustrated in FIGURE 3 so that the group of flues 22 are "on" flues and the interconnected group of flues 20 are "off" flues, the reversing mechanism opens the rich gas valve 96 associated with flues 22 and closes rich gas valve 96 associated with the group of flues 20. The waste heat valves 120 associated with flues 22 are closed and the air valves 114 are opened. The waste heat valves 120 associated with flues 20 are open and air valves 114 are closed. Thus the direction of flow of the waste gas is reversed so that combustion takes place in flues 22 and waste gas is exhausted through flues 20.

FIGURE 4 illustrates diagrammatically the valve arrangement when the coke oven battery is heated with lean gas. The rich gas valves 96 associated with both groups of flues 20 and 22 are closed. One of the lean gas valves 112 associated with the group of flues 20 is opened. The air valve 114 that controls the flow of air to the same sole flue as lean gas valve 112 is closed so that only lean gas is supplied to regenerator 32. The air valve 114 for regenerator 34 is open so that lean gas is being preheated in regenerator 32 and air is being preheated in regenerator 34. The lean gas and air are admixed in the group of flues 20 and are ignited therein. The waste heat is conveyed through the "off" flues 22 into regenerators 36 and 38 and flows through open waste heat valves 120. The air valves 114 and lean gas valve 120 associated with the regenerators 36 and 38 and vertical flues 22 are closed. When the cycle is reversed the lean gas valve 120 associated with regenerator 36 is opened and air valve 114 is closed. The air valve 114 associated with regenerator 38 is opened and the corresponding valves associated with regenerators 32 and 34 are closed. The formerly open waste heat valves are closed and the other waste heat valves are open.

Thus, it will be seen from the above brief description of the manner in which the regenerative coke oven battery is heated by either rich fuel gas or lean fuel gas that the operation depends on the control of the rich gas valves 96 and the air and lean gas valves 112 and 114 associated with the same sole flue and regenerator. To shift from rich fuel gas to lean fuel gas the rich fuel gas valve is closed and the lean fuel gas is opened. As previously discussed, however, the shift from rich fuel gas to lean fuel gas must be accomplished when the above discussed valves are inactive, i.e. when the valves are associated with a group of "off" flues.

FIGURE 5 illustrates in greater detatil the reversing box 106 with the conduit 104 connected to the sole flue 72. The reversing box 106 contains a pair of air valves 114 and 114A, a lean gas valve 112 and a pair of waste gas valves 120 and 120A. The air valves 114 and 114A comprise a pair of lids 122 and 122A hingedly connected to the upper surface of the reversing box 106. The lids 122 and 122A overlie openings in the top surface of the reversing box 106 and when closed prevent the flow of air therethrough into the internal portion of the reversing box 106. The reversing box 106 with the pairs of air valves and waste heat valves is illustrative only. It should be understood the herein disclosed invention is applicable to other types of reversing boxes that contain other valve arrangements. The apparatus for opening and closing the various valves may also be modified without departing from the scope of the invention.

Figure 6:
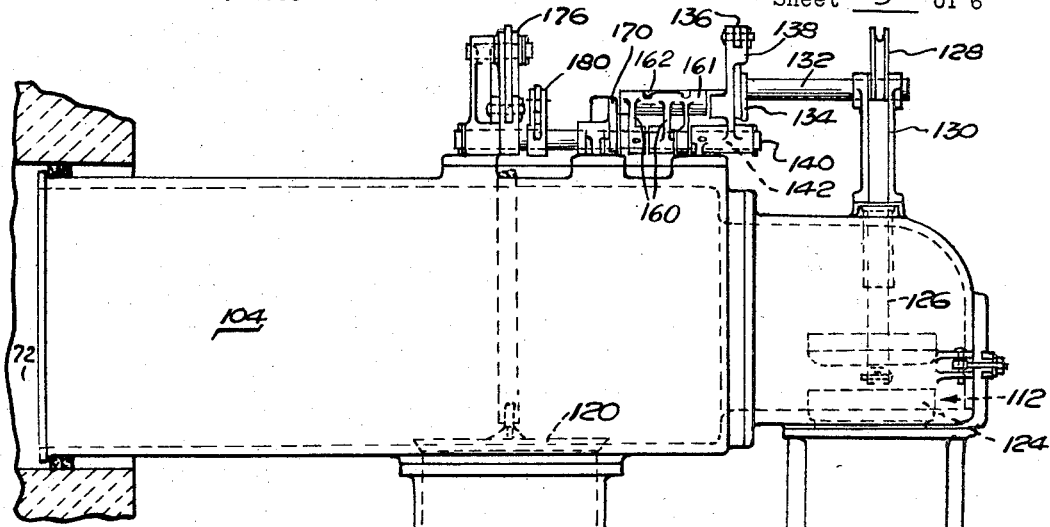
FIGURE 6 is a view in side elevation of the reversing box illustrated in FIGURE 5.
Figure 7:
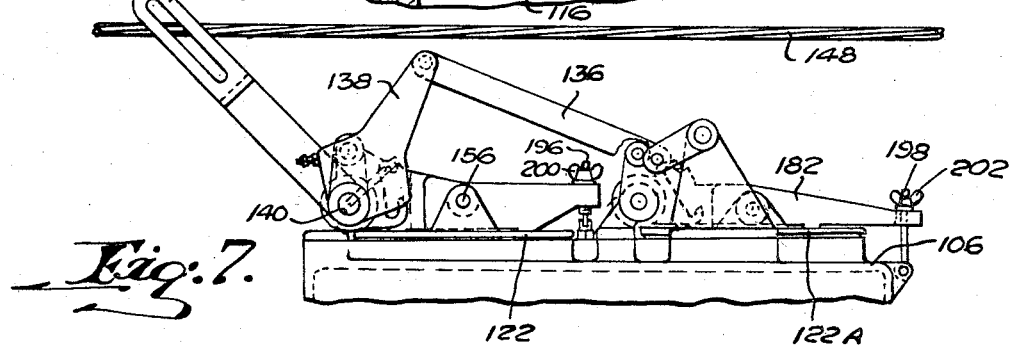
FIGURE 7 is a fragmentary view in front elevation of the mechanism connecting the air, waste heat and lean fuel gas valves to the reversing mechanism and is taken along the line 6—6 of FIGURE 5.

The lean gas valve generally designated by the numeral 112 is illustrated in FIGURES 5 and 6 and includes a valve member 124 that has a vertical valve stem 126 extending upwardly therefrom. The valve stem is connected to a lever 128 that is pivotally supported by a support 130. A shaft 132 is connected at one end to lever 128 so that rotation of shaft 132 moves lever 128 and opens or closes valve 124. The shaft 132 is suitably supported at its other end in a support 134 and is connected to the upper portion of lever 138 so that rotation of lever 138 will actuate lever 136 to open and close the lean gas valve 112. The lever 138 is supported on a shaft 140 and is freely rotatable relative thereto. The lever 138 has a lateral receiver 142 which is arranged to receive the shaft portion of the actuator or clutch generally designated by the numeral 144. Secured to shaft 140 is a reversing lever 146 that is connected to the reversing rod or cable 148, as illustrated in FIGURE 7. Thus linear movement of reversing cable 148 will rotate the reversing lever 146 on shaft 140. The shaft 140 is suitably journaled in the supports 150 on upper surface of the reversing box 106.

The air lid 122 has lever 152 hingedly secured thereto intermediate its end portions at 154 by means of a pin 156. The lever has a clevis end portion 158 through which shaft 140 extends. Rotation of shaft 140 will not, therefore, open or close the air lid 114 until the shaft portion of the actuator or clutch 144 engages a receiver in lever 152 to connect the lever 152 to the shaft 140 as later described.

As illustrated in FIGURES 5 and 6 the clutch or actuator 144 has a pair of depending portions 160 with aligned bores through which shaft 140 extends. The depending portions 160 are suitably secured to shaft 140 for rotation therewith. The upper portion 161 of actuator 144 has a longitudinal bore 162 therethrough and a U shaped slotted portion 164 in its external surface. An actuating shaft 166 is slidingly positioned within the longitudinal bore 162 and is connected to a rod 168 (FIGURE 5) that extends through the U shaped slot 164. The shaft 166 has substantially the same longitudinal dimensions as the actuator upper portion so that a portion of the shaft 166 extends beyond an end of the actuator upper portion 161 when the rod 168 is in a leg of the U shaped slot 164. The lever 152 connected to the air lid 114 has a recessed receiver 170 for the end portion of shaft 166 to thereby connect the actuator 144 to the air lid 114.

With this arrangement, when it is desired to operate the reversing box on lean gas the rod 168 associated with actuator or clutch 144 is moved from left to right in the U shaped slot 164, as illustrated in FIGURE 5, so that shaft 166 has an end portion extending into receiver 142 in upwardly extending lever 138. Motion of reversing lever 146 will be transmitted through the actuator 144 to the lever 138 to thus actuate the lean gas valve 112. Because the shaft 166 of actuator 144 does not engage the receiver 170 in lever 152 associated with air lid 114, the air lid is inactive on movement of the reversing lever 146.

To shift the reversing box from lean gas to air the rod 168 of actuator 144 is moved from right to left as viewed in FIGURE 6 so that the right end portion of shaft 166 as viewed in FIGURE 6 is disengaged from receiver 142 and the other end of shaft 166 is moved into engagement with the receiver 170 associated with air lid 114. Movement of the reversing lever 146 will then be transmitted through the clutch or actuator 144 to the air lid 114 and open or close the air lid as required. The lean gas valve 112 will remain in a closed position because the clutch or actuator 144 is disengaged therefrom.

The waste heat valve 120 is connected to a lever 172 and the lever 172 is in turn nonrotatably secured to the shaft 140. Rotation of shaft 140 will thus open and close the lean gas valve 120. The other waste gas valve 120A is similarly connected to a lever 174 that is connected through a linkage 176 to a shaft 178. The shaft 178 is, in turn, connected to the shaft 140 through a connecting linkage 180 so that rotation of shaft 140 will be transmitted to shaft 178. The rotation of shaft 140 through a given quadrant will open and close the waste heat valves 120 and 120A through the previously described linkages. There are included lost motion linkages for the waste heat valves and the air lids that are arranged to sequentially open and close the respective valves as the reversing lever pivots through an angle of 90°. This lost motion linkage does not form a part of the invention and is therefore not described in detail. An actuator clutch and suitable lost motion linkages are illustrated and described in U.S. Patent 1,920,949.

The air lid 122A has a lever 182 that is pivotally connected to the lid by means of a pin 184. The lever 182 has a journal portion through which shaft 178 extends and is rotatable relative thereto. The shaft 178 has a clutch 186, similar in construction to clutch or actuator 144, positioned thereon and movable therewith. The clutch 186 has a laterally movable shaft 188 that is arranged to be positioned in a receiver 190 formed in lever 182. Thus when the shaft 188 is moved laterally to the left as viewed in FIGURE 5, the clutch or actuator 186 is engaged to the lever 182. When the actuator shaft is positioned in receiver 188, the rotation of shaft 140 is transmitted through lever 180 to shaft 178 and through clutch 186 to the lever 182 connected to air lid 122A to thus open or close the air lid 122A. Where it is desired to open both air lids 122 and 122A the clutch or actuators 144 and 186 have their shafts 161 and 188 moved to the left as viewed in FIGURE 5 into the respective receivers 170 and 190.

The levers 152 and 182 each have slotted end portions 192 and 194. Bolts 196 and 198 are hingedly connected to the upper surface of the reversing box 106 and have wing nuts 200 and 202 threaded thereon. To lock the air lids 122 and 122A in a closed position, the hinged bolts 196 and 198 are positioned in the respective slots 192 and 194 and the wing nuts 200 and 202 are tightened.

The previously described arrangement for actuating either the air lids 114 and 114A or the lean gas valve 112, and for locking the air lids in a closed position is conventional structure that has been used in the past to manually shift the coke ovens from lean gas to rich gas. With the previously described apparatus the clutches or actuators 144 and 186 must be manually positioned for either the air lids or the lean gas valve to be opened or closed by the reversing lever 146. Also, the air lids or valves are manually locked in a closed position by the bolt and wing nut arrangement. It is apparent from the above description that a substantial amount of time and manual effort is required to shift the coke oven battery from lean gas to rich gas, or from rich gas to lean gas. It should be understood that different types of lever arrangements may be provided where both air lids are interconnected by a lever and only one clutch or actuator, similar to actuator 144, is employed.

The previous description of a conventional reversing box and the manually operated clutch or actuator have been described as a background for the hereinafter described remotely controlled apparatus for shifting all of the cltuches associated with the reversing boxes connected to the "off" flues. The apparatus previously described for the reversing boxes need not be changed substantially to accommodate the remotely controlled actuator for the shifting operation. The clutch or actuator, which functions in a manner similar to clutch or actuator 144, illustrated in FIGURE 5, is modified as is illustrated in FIGURES 8 and 9.

Figures 8, 9:
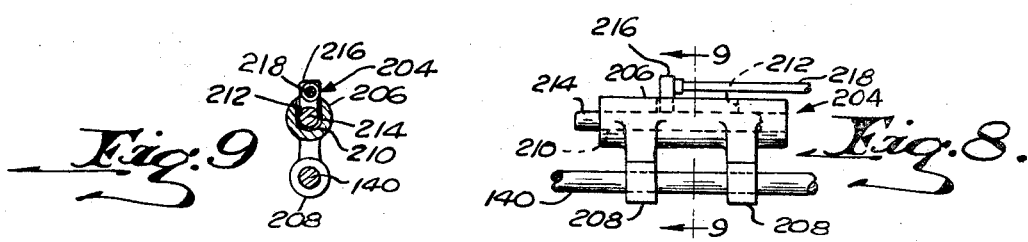
FIGURE 8 is a fragmentary view in side elevation of the lean gas-air valve actuator or clutch modified to be actuated by the apparatus illustrated in FIGURE 10.
FIGURE 9 is a view in section taken along the line 9—9 of FIGURE 8.

The remotely controlled clutch or actuator generally designated by the numeral 204 in FIGURES 8 and 9 has a body portion 206 with a pair of depending boxes 208 through which a shaft similar to shaft 140 extends. The depending portions 208 are suitably secured to the shaft 140 so that rotation of shaft 140 is transmitted to the actuator 204 for movement therewith. The actuator body portion 206 has a longitudinal bore 210 therethrough and an elongated slot 212 opening into the longitudinal bore 210. An actuating shaft 214 is slidingly positioned in the bore 210 and is connected to an arm 216 that extends upwardly through the elongated slot 212 in body portion 206. Connected to the arm 216 by a suitable connector in a rod or cable 218. Thus with linear reciprocatory movement of cable 218 the shaft 214 will extend beyond one or the other end portion of the actuator body portion 206 and is arranged to be suitably seated in receivers similar to receiver 142 associated with the levers for the lean gas valve, or receiver 170 associated with the lever for the air lid 114.

The apparatus for remotely moving the shafts 214 of the respective reversing boxes is illustrated in FIGURE 10 where conduit 220 is connected to a suitable source of high pressure hydraulic fluid diagrammatically indicated by the numeral 222. The conduit 220 supplies high pressure hydraulic fluid to the pair of valves 224 and 226. The valve 224 has a pair of conduits 228 and 230 connected thereto. Both conduits 228 and 230 are connected to servo mechanisms such as hydraulic cylinders designated by the numerals 232, 234, 236 and 238. Each cylinder is associated with a separate reversing box for a row of flues. Thus a plurality of cylinders similar to cylinders 232, 234, 236 and 238 would be associated with all of the "off" flues of a coke oven battery. The valve 226 has a pair of conduits 240 and 242 that are also connected to hydraulic cylinders 244, 246, 248 and 250 that are associated with the reversing boxes of the "on" flues. Each of the reversing boxes is thus provided with a hydraulic cylinder for the actuation of a clutch member, as later described. The valve 224 has a lever type actuator 252 that is biased in the position illustrated in FIGURE 10 by means of a spring 254. The actuator 252 is arranged to move a valve stem within valve 224 to direct the high pressure hydraulic fluid from conduit 220 to either conduit 228 or conduit 230 and to vent the other conduit to atmosphere as indicated by vent conduit 256. For example, in the full line position indicated in FIGURE 10, the high pressure fluid supplied by conduit 220 flows through valve 224 into conduit 228. The conduit 230 is connected through valve 224 to vent conduit 256. With this arrangement, high pressure fluid is transmitted through the conduit 228 to the upper portion of all of the cylinders 232, 234, 236 and 238 to exert a force on the piston positioned therein and move the piston downwardly as viewed in FIGURE 10. The lower portions of the cylinders are vented by means of the conduit 230. To move the upper piston rods within the cylinders 232, 234, 236 and 238 to an extended position, the actuator handle 252 is moved to the second position, indicated in dotted lines in FIGURE 10. The high pressure fluid from conduit 220 flows through valve 224 and into conduit 230 to thereby supply high pressure fluid to the underside of the pistons within the cylinders 232, 234, 236 and 238. The conduit 228 is connected through valve 224 to vent conduit 256 to permit the hydraulic fluid within the upper portion of cylinders 232, 234, 236 and 238 to be vented to the atmosphere. The cylinders are provided with a pair of piston rods extending from opposite ends of the cylinder as will be explained in conjunction with FIGURE 11.

A lock device diagrammatically illustrated and indicated by the numeral 258 is connected to the reversing machine. When the bank of flues are "on" flues, the lock device 258 moves into locking position preventing the actuation of valve actuator 252. When the reversing machine shifts the flues so that the flues associated with the cylinders 232, 234, 236 and 238 are "off" flues, the locking mechanism 258 moves out of the path of the actuating handle 252 so that the "off" flues in the coke oven battery may be remotely shifted by lever 252. The cylinders 244, 246, 248 and 250 that are associated with the other bank of flues are actuated by means of valve 226 in a manner similar to valve 224. The actuator handle 260 associated with valve 226 has a similar locking device 262 extending into the path of handle 260. The lock 262 remains in a locked position in the path of handle 260 as long as the flues associated with cylinders 244, 246, 248 and 250 are "on" flues. The reversing mechanism will withdraw the locking mechanism 262 when the flues associated with cylinders 244, 246, 248 and 250 are "off" flues. Thus, one of the locking devices 258 or 262 extends in the path of one of the levers 252 or 260, depending on whether the flues associated with the previously described cylinders are "on" flues or "off" flues.

In FIGURE 11 an installation at a reversing box for remote shifting is illustrated. For convenience, the hydraulic cylinder in FIGURE 11 will be designated cylinder 232 and the supply conduits 228 and 230 are not illustrated as connected thereto. It should be understood, however, that conduits 228 and 230 are connected to cylinder 232 in FIGURE 11 in the same manner as is illustrated in FIGURE 10. The cylinder 232 has a piston 264 with a pair of piston rods 266 and 268 extending from opposite ends thereof. Piston rod 268 is connected to a rod or cable 270 that is similar to cable 218 previously described with respect to FIGURE 8. The cable 218 is connected to the arm 216 of the actuator clutch 204. Thus, by movement of piston 264 in the direction from right to left the cable 218 moves linearly to move the clutch shaft 214 to engage the receiver associated with the lean gas valve so that during the next cycle the reversing mechanism will open the lean gas valve. Movement of the cylinder 264 from left to right as viewed in FIGURE 11 moves the cable 218 and clutch shaft 214 to engage the receiver for the air lids and during the next cycle the air lids will open and supply air to the reversing box. The other piston rod 266 extending from cylinder 232 is connected to an equalizing device 272 that has a pair of rods 274 and 276 extending therefrom. Rod 274 is connected to air lid locking handle 278 associated with an air lid 122, and rod 276 is connected to a locking handle 282 associated with an air lid 122A. The locking handles 278 and 282 are of similar construction and are suitably pivotally connected at 286 to the upper surface of the reversing box. The locking levers have an upwardly extending portion 288 that is arranged to abut the upper surface of the hinge 290 of air lid 122 to thereby lock the air lid 122 in a closed position. Since the lever 282 is of similar construction, similar numerals will designate similar parts. The equalizer 272 is so arranged that equal forces are exerted on the levers 278 and 282 by the piston rod 266 extending from cylinder 232. Thus, when the piston 264 is moved to the left as illustrated in FIGURE 11, the locking handles are pivoted into a position where the portions 283 abut the lid hinge 290 and lock the air lids in a closed position. When the piston 264 is moved from left to right the rod 266 and connected rods 272 and 274 pivot the locking handles 278 and 282 to disengage the portions 288 from the lid hinge portions 290 to permit the reversing lever to open the air lids during the "on" cycle.

A signal device is provided at the control panel adjacent the actuator handles 252 and 260 to visually indicate the condition of the air lids. A circuit comprising wires 292 and 294 is connected to a suitable source of current and to a visual indicator such as a bulb at the control panel (not shown). The circuit has three pressure actuated switches 296, 298 and 300 in wire 294. If any of the switches 296, 298 or 300 are open, the circuit is open and the bulb at the control panel is off. Where all switches 296, 298 and 300 are closed, the circuit is complete and the bulb will glow, indicating that pressure is supplied to the cylinder and the air lids are in a closed and locked position. The switch 296 has a hydraulic conduit 302 connected thereto and to the cylinder 232 adjacent one end. When hydraulic fluid under pressure is supplied to the cylinder 232 to move the piston to the left as indicated in FIGURE 11, hydraulic fluid under pressure is supplied to switch 296 through conduit 302 to close switch 296. When the lids 122 and 122A are in a closed and locked position a portion of the lid hinge 290 moves an actuator of switches 298 and 300 into a closed position thrus closing switches 298 and 300 and completing the circuit. The operator at the central control panel is thus informed whether the air lids are in a properly locked position when the respective reversing boxes are arranged to open the lean gas valve during the next "on" cycle and whether pressure has been supplied to the clutch actuator to move it into engagement with the lean gas receiver.

FIGURE 13 illustrates the manner in which the rich gas valves are controlled by the hydraulic pressure supplied to the respective cylinders for the clutches or actuators. Conduits 228, 230, 240 and 242 are illustrated in FIGURE 13. Conduits 228 and 230 are connected to opposite ends of a hydraulic cylinder 304 by means of branch conduits 306 and 308. The cylinder 304 has a rod 310 extending therefrom that is arranged to reciprocate within cylinder 304 when the piston within the cylinder 304 is subjected to hydraulic pressure supplied through either conduit 306 or 308. The piston rod 310 is connected to a pair of actuator arms 312 and 314 that control the rich gas valves 316 and 318. A rich gas main 320 has branch conduits 322 and 324 connected to gun flues of two rows of flues. It should be understood that similar arrangements are provided for all of the gun flues in the bank of "on" flues. Thus when the actuator lever 252 is positioned so that the "off" flues during the next cycle will burn rich gas, hydraulic fluid under pressure is supplied through the proper conduit to the cylinder 304 to move valve levers 312 and 314 to open the valves 316 and 318. During the next cycle, rich gas will be supplied to the previously "off" flues when they serve as "on" flues. Where the actuating lever is moved so that the flues during the next cycle are to be heated with lean gas, fluid under pressure is supplied through the other of the pair of conduits 228 and 230 to move the piston rod 310 in the opposite direction and close the rich gas valves.

Suitable means may be provided to disengage the levers 312 and 314 from the valves 316 and 318 and separate control of the gas valves may be accomplished.

The conduits 240 and 242 are connected to the gas valves 326 and 328 in a similar manner with apparatus similar to that described in conjunction with valves 316 and 318 and are actuated in a similar manner by the actuator handle 260 at the central control station.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A regenerative coke oven battery having apparatus for alternatively connecting the air valves and the lean gas valves to the reversing mechanism comprising:
  a centrally located actuator,
  a plurality of clutch actuators each located remotely to said centrally located actuator and each of said clutch actuators located adjacent to an air valve and a lean gas valve arranged to alternatively supply air and lean gas to a combustion chamber during the combustion cycle, said clutch actuators operable to alternatively connect the air valves and lean gas valves to the reversing mechanism, and
  means connecting said centrally located actuator to said plurality of clutch actuators so that in one position of said centrally located actuator said clutch actuators connect said air valves to said reversing mechanism and in a second position of said centrally located actuator said clutch actuators connect said lean gas valves to said reversing mechanism.

2. A regenerative coke oven battery having apparatus for alternatively connecting the air valves and the lean gas valves to the reversing mechanism comprising:
  a centrally located actuator,
  a plurality of clutch actuators each located remotely to said centrally located actuator and each of said clutch actuators located adjacent to an air valve and a lean gas valve arranged to alternatively supply air and lean gas to a combustion chamber during the combustion cycle, said clutch actuators operable to alternatively connect the air valves and lean gas valves to the reversing mechanism,
  a plurality of lock mechanism each located adjacent an air valve and arranged to lock said respective air valve in a closed position so that said air valve remains closed during the combustion cycle, and
  means connecting said centrally located actuator to said plurality of clutch actuators and to said plurality of lock mechanisms so that in one position of said centrally located actuator said clutch actuators connect said air valves to said reversing mechanism and unlock said lock mechanisms and in a second position of said centrally located actuator said clutch actuators connect said lean gas valves to said reversing mechanism and lock said lock mechanisms.

3. A regenerative coke oven battery having apparatus for alternatively connecting the air valves and the lean gas valves to the reversing mechanism as set forth in claim 2 which includes:
  signal means connected to each air valve and operable to provide a signal at a station adjacent to said centrally located actuator indicating that said air valves are closed and said lock mechanisms are in a locked position.

4. A regenerative coke oven battery having apparatus for alternatively connecting the air valves and the lean gas valves to the reversing mechanism comprising:
  a centrally located actuator,
  a plurality of clutch actuators each located remotely to said centrally located actuator and each of said clutch actuators located adjacent to an air valve and a lean gas valve arranged to alternatively supply air and lean gas to a combustion chamber during the combustion cycle, said clutch actuators operable to alternatively connect the air valves and lean gas valves to the reversing mechanism,
  a plurality of rich gas valves operable to control the flow of rich fuel gas,
  means connecting said centrally located actuator to said plurality of clutch actuators and to said rich gas valves so that in one position of said centrally located actuators said clutch actuators connect said air valves to said reversing mechanism and open said rich gas valves and in a second position connect said lean gas valve to said reversing mechanism and close said rich gas valves.

5. A regenerative coke oven battery having apparatus for alternatively connecting the air valves and lean gas valves to the reversing mechanism as set forth in claim 1 which includes lock means associated with said centrally located actuator, said lock means operable to prevent the movement of said centrally located actuator from one position to another position during the combustion cycle.

6. A regenerative coke oven battery having apparatus for alternatively connecting the air valves and lean gas valves to the reversing mechanism comprising:
  a centrally located signal generating means,
  a plurality of two position servo-mechanisms each located remotely to said centrally located signal generating means, each of said servo-mechanisms operable to alternatively connect the separate air valves and lean gas valves to the reversing mechanism, said two position servo-mechanisms operable to be actuated by a signal from said signal generating means, signal conducting means connecting said signal generating means and said two position servo-mechanisms so that in response to one signal from said signal generating means said two position servo-mechanisms are moved to a first position and connect said air valves to said reversing mechanism and in response to a second signal from said signal generating means said two position servo-mechanisms are moved to a second position and connect said lean gas valves to said reversing mechanism.

7. A regenerative coke oven battery having apparatus for alternatively connecting the air valves and the lean gas valves to the reversing mechanism comprising:
a centrally located signal generating means,
a plurality of clutch actuators each located remotely to said centrally located signal generating means, each of said clutch actuators operable to alternatively connect the air valves and lean gas valves to the reversing mechanism,
a two position servo-mechanism connected to each clutch actuator and arranged upon actuation to move said clutch actuator to alternatively connect said air valves to said reversing mechanism and said lean gas valves to said reversing mechanism, said two position servo-mechanism operable to be actuated by a signal from said signal generating means, and
signal conducting means connecting said signal generating means and said two position servo-mechanisms so that in response to one signal from said signal generating means said two position servo-mechanisms are moved to a first position and move said clutch actuators to connect said air valves to said reversing mechanism and in response to a second signal from said signal generating means said two position servo-mechanisms are moved to a second position and move said clutch actuators to connect said lean gas valves to said reversing mechanism.

8. A regenerative coke oven battery having apparatus for alternatively connecting the air valves and the lean gas valves to the reversing mechanism as set forth in claim 7 which includes:
a plurality of lock mechanisms each located adjacent an air valve and arranged to lock said respective air valve in a closed position so that said air valve remains closed during the combustion cycle,
each of said lock mechanisms connected to one of said two position servo-mechanisms in a manner that when one signal is transmitted from said signal generating means said lock mechanisms are in an unlocked position and when a second signal is transmitted from said signal generating means said lock mechanisms are in a locked position.

9. A regenerative coke oven battery having apparatus for alternatively connecting the air valves and the lean gas valves to the reversing mechanism as set forth in claim 7 which includes:
a plurality of rich gas valves operable to control the flow of rich fuel gas,
other two position servo-mechanisms connected to each rich gas valve and operable in one position to open said rich gas valves and in a second position to close said rich gas valves,
said signal conducting means connected to said other servo-mechanisms so that in response to one signal from said signal generating means said other two position servo-mechanisms are moved to a first position and open said gas valves and in response to a second signal from said signal generating means said other two position servo-mechanisms are moved to a second position and close said gas valves.

10. A regenerative coke oven battery having apparatus for alternatively connecting the air valves and the lean gas valves to the reversing mechanism comprising:
a source of pressurized hydraulic fluid,
a centrally located valve member,
a plurality of clutch actuators each located remotely to said centrally located valve member, each of said clutch actuators operable to alternatively connect an air valve and lean gas valve to the reversing mechanism,
hydraulically actuated members movable to two positions by hydraulic fluid under pressure, said hydraulically actuated members having a pair of spaced conduit connections and operable by pressurized hydraulic fluid supplied to one of said conduit connections to move to one of said preselected positions, said hydraulically actuated members mechanically connected to said respective clutch actuators and operable to move said clutch actuators to alternatively engage said air valves and said lean gas valves to said reversing mechanism,
a pair of other conduits connected to said valve member and to said pair of spaced conduit connections in said hydraulically actuated members,
said valve member arranged to alternatively connect said source of pressurized fluid with one of said pair of other conduits to thereby supply pressurized hydraulic fluid to said hydraulically actuated members and position said hydraulically actuated members in one of said two positions and thereby through said clutch actuators alternatively connect said air valves and said lean gas valves to said reversing mechanism, and
actuating means associated with said valve member and operable to control said valve member and selectively connect said source of pressurized hydraulic fluid with one of said pair of other conduits.

11. A regenerative coke oven battery having apparatus for alternatively connecting the air valves and the lean gas valves to the reversing mechanism as set forth in claim 10 which includes:
a plurality of lock mechanism each located adjacent an air valve and arranged to lock said respective air valve in a closed position so that said air valves remain closed during the combustion cycle,
each of said lock mechanisms connected to one of said hydraulically actuated members in a manner that when hydraulic fluid under pressure is supplied to one of said other conduits said lock mechanisms are in an unlocked position and when the other of said other conduits is supplied with pressurized hydraulic fluid said lock mechanisms are in a locked position.

References Cited

UNITED STATES PATENTS

| | | | |
|---|---|---|---|
| 1,920,949 | 8/1933 | Herrmann | 137—309 |
| 1,961,265 | 6/1934 | Van Ackeren | 202—141 XR |
| 2,054,183 | 9/1936 | Van Ackeren | 137—309 XR |
| 2,234,172 | 3/1941 | Hughes | 202—142 XR |
| 2,710,281 | 6/1955 | Weissenborn | 202—141 |
| 2,732,289 | 1/1956 | Goeke | 137—309 XR |
| 3,344,039 | 9/1967 | Nestler | 202—141 XR |

NORMAN YUDKOFF, *Primary Examiner.*

DAVID EDWARDS, *Assistant Examiner.*

U.S. Cl. X.R.

137—309